Aug. 24, 1943.  G. F. JACKSON  2,327,430
MACHINE FOR VACUUMIZING, GASSING, AND
HAND SEALING FILLED CONTAINERS
Filed Aug. 12, 1941   4 Sheets-Sheet 4

INVENTOR
George F. Jackson
Mason & Porter
ATTORNEYS

Patented Aug. 24, 1943

2,327,430

UNITED STATES PATENT OFFICE 2,327,430

MACHINE FOR VACUUMIZING, GASSING, AND HAND-SEALING FILLED CONTAINERS

George F. Jackson, Baltimore, Md., assignor to Continental Can Company, Inc., New York, N. Y., a corporation of New York Application August 12, 1941, Serial No. 406,529

14 Claims. (Cl. 226—86)

The invention relates generally to container sealing machines and primarily seeks to provide a novel, simple and efficient hand-operated machine in which filled containers can be vacuumized to draw all air out of the head spaces in the containers and from the interstices in the products therein, then have said head spaces and product interstices filled with an inert gas such as nitrogen, and then be permanently sealed within the chamber in which said vacuumizing and gassing treatment is effected.

In its more detailed nature the invention seeks to provide certain new and useful improvements in the hand sealing machine disclosed in the U. S. Letters Patent 2,183,903, issued on December 19, 1939, to Gerald L. Ardron. This machine embodies a seaming chamber, a container rotating chuck in the chamber, seaming means manually engageable with a container rotated by the chuck, a container supporting pad movable toward and from the chuck, and means for drawing a vacuum in said chamber. Said improvements include the provision of a single valve for effecting a vacuumizing of the chamber and a subsequent introduction of nitrogen or other inert gas thereinto, means for lifting the pad to chuck the container after it has been vacuumized and gassed, and novel means for locking and holding the pad in the elevated position while the sealing of the container is being effected.

Another object of the invention is to provide a machine of the character stated in which the chuck is magnetized so as to hold a container closure thereagainst while the complementary container is being vacuumized and gassed and before it is chucked by elevation of the supporting pad.

Another object of the invention is to provide a machine of the character stated in which novel means is provided for locking the door.

Another object of the invention is to provide a machine of the character stated in which a hand lever is provided for actuating the single valve by which the vacuumizing and gassing of the containers is controlled, together with novel means for normally holding the valve in a neutral position in which communication between the chamber and both the gassing and vacuumizing sources is cut off.

Another object of the invention is to provide a machine of the character stated in which is included novel means for automatically releasing the pad locking or holding devices each time the door is swung to the open position, thereby to permit a lowering of the container supporting pad or a returning thereof to its normal position.

Another object of the invention is to provide a machine of the character stated in which there is included a main, high pressure gas source and a supplementary or auxiliary reservoir which communicates directly with the control valve and in which a relatively low gas pressure is substantially constantly maintained by communication with the main gas tank through a suitably adjusted reducing valve.

With the above and other objects in view which will more fully appear, the nature of the invention will be more clearly understood by following the description, the appended claims, and the several views illustrated in the accompanying drawings.

In the drawings:

Figures 6, 7 and 8 are detail horizontal sections of the control valve and respectively illustrating the neutral, the vacuumizing, and the gassing positions of said valve.

Figure 9 is a detail perspective view illustrating the door locking disk.

Figure 10 is a fragmentary perspective view illustrating the cooperative relation of the end extremities of the pad locking rods.

Figure 11 is a fragmentary vertical cross section illustrating the locking rod carried L-bracket.

Figure 1:
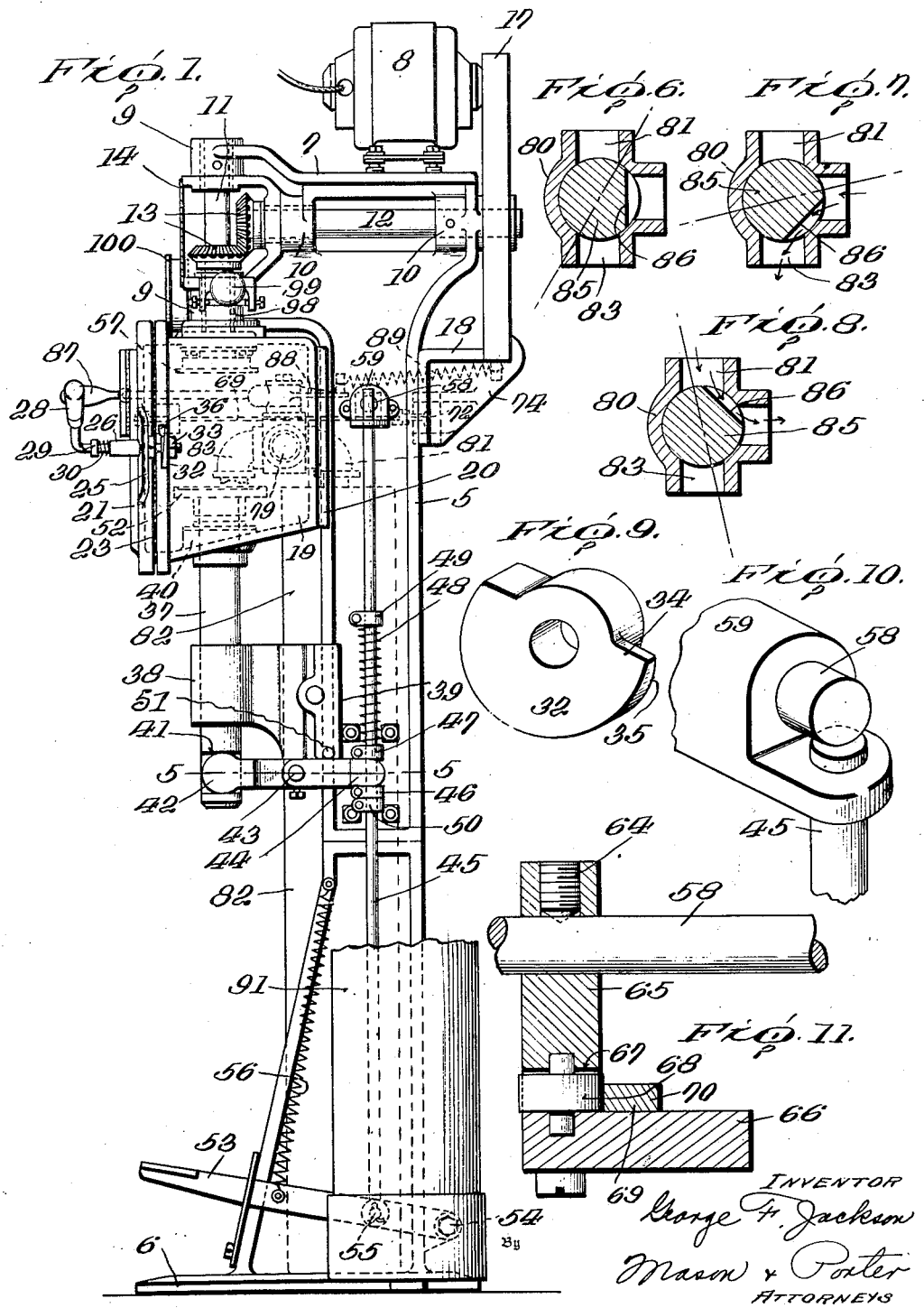
Figure 1 is a right side elevation of a machine embodying the invention, a part of the main gas tank being broken away to better illustrate the pad latching equipment, and the pad being illustrated in the lowered position in which the vacuumizing and gassing of the containers is effected.
Figure 2:
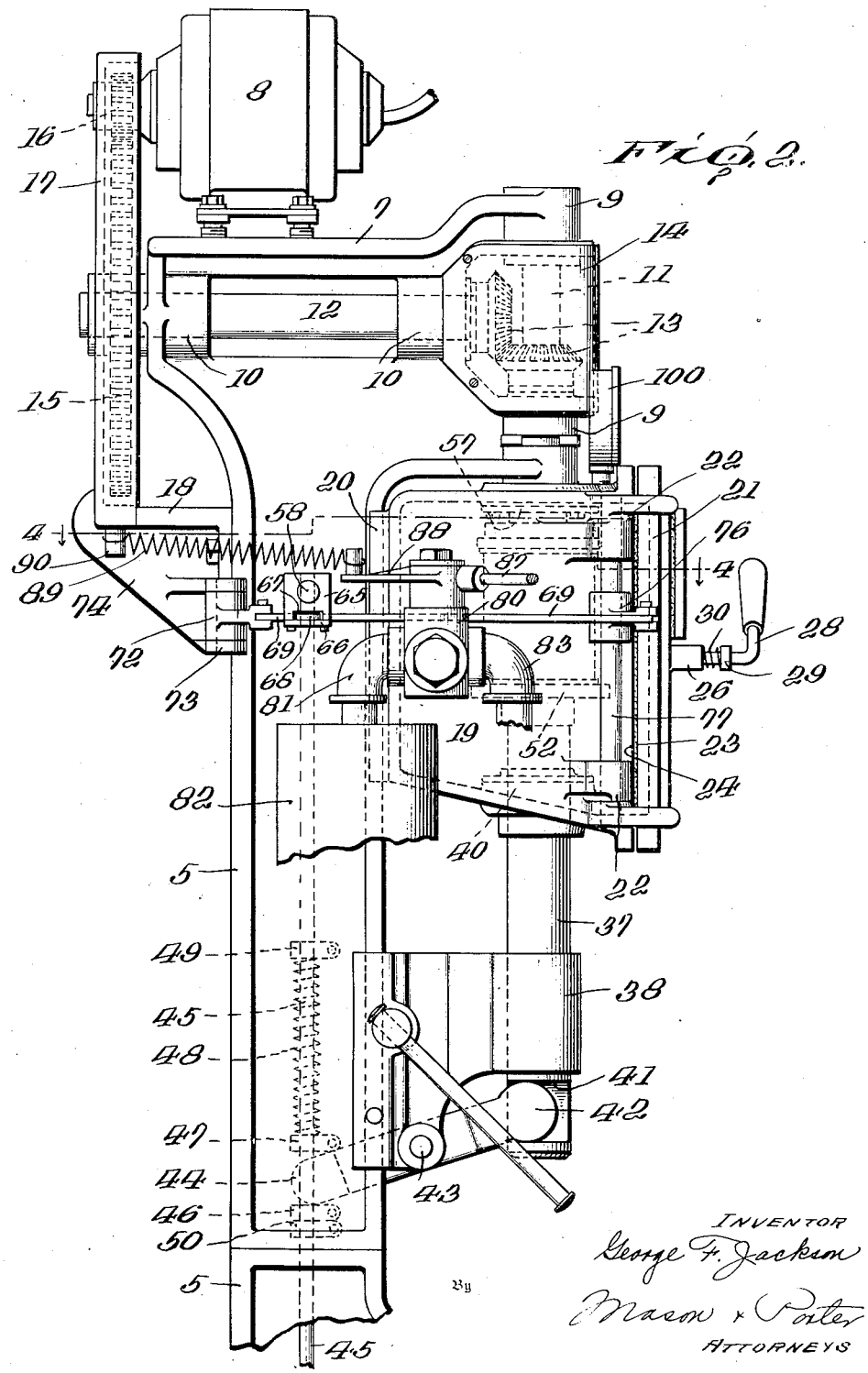
Figure 2 is an enlarged left side elevation of the machine illustrated in Figure 1, the pad being illustrated as locked in its lifted or container chucked position in which the container sealing operation is effected.
Figure 3:
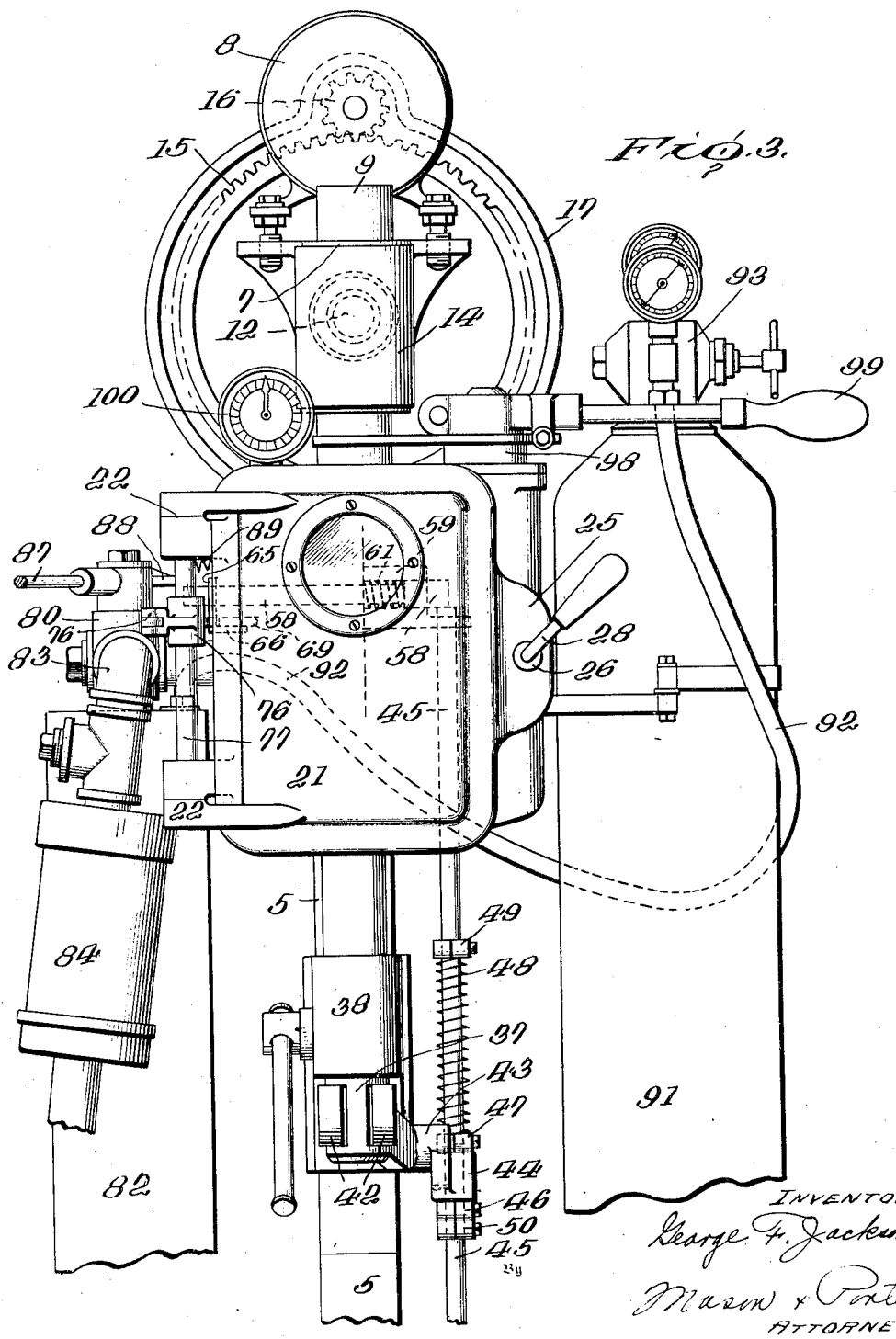
Figure 3 is a face view of the machine, the parts being positioned as illustrated in Figure 2.

In the example of embodiment of the invention herein illustrated the machine includes a frame standard 5 supported on a base 6 and provided at its upper end with a table portion 7 on which an electric motor 8 is removably mounted.

The framing also is formed to provide spaced vertical bearings 9 and spaced horizontal bearings 10. A shaft 11 is rotatably mounted in the bearings 9, and a shaft 12 is rotatably supported in the bearings 10, said shafts being connected in driving relation by intermeshing bevel gears 13. A suitable housing 14 is formed on the framing and surrounds the gear coupling 13.

At its rear end the shaft 12 carries a large spur gear 15 to which rotation is imparted by a small driver pinion 16 carried by the drive shaft of the motor 8. A suitable protective guard 17 secured, as at 18, upon the frame standard provides a suitable housing for the gears 15 and 16.

A vacuumizing and gassing chamber housing 19 is secured, as at 20, upon the frame standard and includes an open front adapted to be closed by a door 21 hinged, as at 22, to the housing and equipped with a sealing gasket 23 for engaging the front face 24 defining the open front of the housing and which serves to provide an air tight and gas tight seal.

A door is equipped with a handle mounting flange 25 which extends from the right hand edge thereof and is equipped with a locking handle supporting bearing 26. A locking handle shank 27 is rotatably and slidably mounted in the bearing 26 and is angle bent at its front end to provide an operating crank or handle portion 28. The shank has an abutment collar 29 affixed thereto and a compression spring 30 is interposed between this collar and the flange bearing 26, said spring serving to constantly urge the shank in the forward direction and the abutment 31 secured to the handle shank against the rear face of the bearing 26. A locking disk 32 is secured, as at 33, upon the rear end of the handle shank and is equipped with an edge cutout or recess 34 and a camming surface 35 which is engageable behind the locking lug 36 projected from the housing 19. It will be obvious that by closing the door with the handle 28 turned so as to permit the locking disk recess 34 to clear the locking lug 36, and then turning said handle to cause the disk to engage behind said lug, the door can be locked in its closed position against any pressure exerted by the gas within the housing 19.

A container supporting column 37 is vertically reciprocable in a guide bearing 38 which is adjustably supported, as at 39, upon the frame standard 5. This column passes through an oil sealed bearing 40 provided therefor in the bottom of the housing 19 into the interior of said housing. At its lower end the column 37 is recessed, as at 41, to receive the bifurcated end 42 of a crank lever pivoted intermediate its ends, as at 43, upon an extension of the housing support 39. The remaining free end of the lever is bifurcated, as at 44, and straddles a pad locking rod 45 between two collars 46 and 47, the collar 46 being secured to the rod below said lever end, and the collar 47 being loosely mounted on said rod above said lever end and yieldably opposed by a compression spring 48 which surrounds the rod between the collar 47 and an abutment collar 49 secured to the rod in spaced relation thereabove. The fixed collar 46 may be supplemented by an additional fixed abutment collar 50 if desired. The rod 45 and the column 37 are thus connected to move in unison and it will be obvious that as the rod 45 is depressed the column 37 will be moved upwardly and when said rod moves upwardly said column will move downwardly. A stop pin 51, projecting from the support 39, engages the lever and serves to limit downward movement of the column 37.

Upon its upper end the column 37 carries a container supporting pad 52, said pad being rotatably mounted on said column in any approved manner. An example of a suitable mounting for this pad is illustrated in the patent hereinbefore referred to.

A treadle 53 is pivotally mounted, as at 54, adjacent the lower end of the standard 5 and is connected intermediate its ends, as at 55, with the lower end of the locking rod 45. A retractile spring 56 which is anchored to the frame standard 5 and connected to the front end of the treadle 53 normally holds the rod 45 in the rod elevated, pad supporting column lowering position illustrated in Figure 1 of the drawings.

At its lower end the driver shaft 11 carries a container rotating chuck 57, and it is to be understood that this chuck is magnetized so as to attract and hold container end closures which are manually placed thereagainst prior to commencement of the vacuumizing, gassing and sealing of a complementary filled container. The adjustable bearing 38, 39 adapts the machine to the seaming of containers of varied lengths as in the patented machine hereinbefore referred to.

A locking rod 58 is reciprocably mounted in transverse relation to and in the vertical plane occupied by the locking rod 45. The rod 58 is slidable in and projects from the ends of a suitable frame bearing 59. Within the frame bearing the rod 58 is equipped with an abutment shoulder 60, and a compression spring 61 is interposed between this shoulder and another abutment shoulder 62 formed in the bearing and this spring serves to constantly urge the rod 58 in a direction for projecting above and preventing upward movement of the upper end extremity 63 of the rod 45.

An L-shaped bracket is secured, as at 64, on the rod 58 and this bracket includes a vertical leg 65 and a horizontal leg or shelf portion 66. The vertical leg is recessed, as at 67, and has an antifriction roller 68 rotatably mounted in its recess in position for having its peripheral portion extend slightly over the shelf portion 66 as illustrated in Figure 11.

A lock rod releasing link 69 is provided and includes a main body portion 70 which is disposed parallel the vertical leg 65 of the bracket and closely overlies the shelf portion 66 in contact with the roller 58. At its rear end the link includes an angle bent portion 71 pivoted to a crank 72 which is in turn pivotally mounted, as at 73, on a bracket 74 fixed to the frame. At its front end the link 69 includes an angle bent portion 75 which is pivoted to a crank member 76 secured to the door pintle 77 so as to have swinging movement imparted thereto as the door is moved in one direction or the other about its pivotal mounting.

Figure 4:
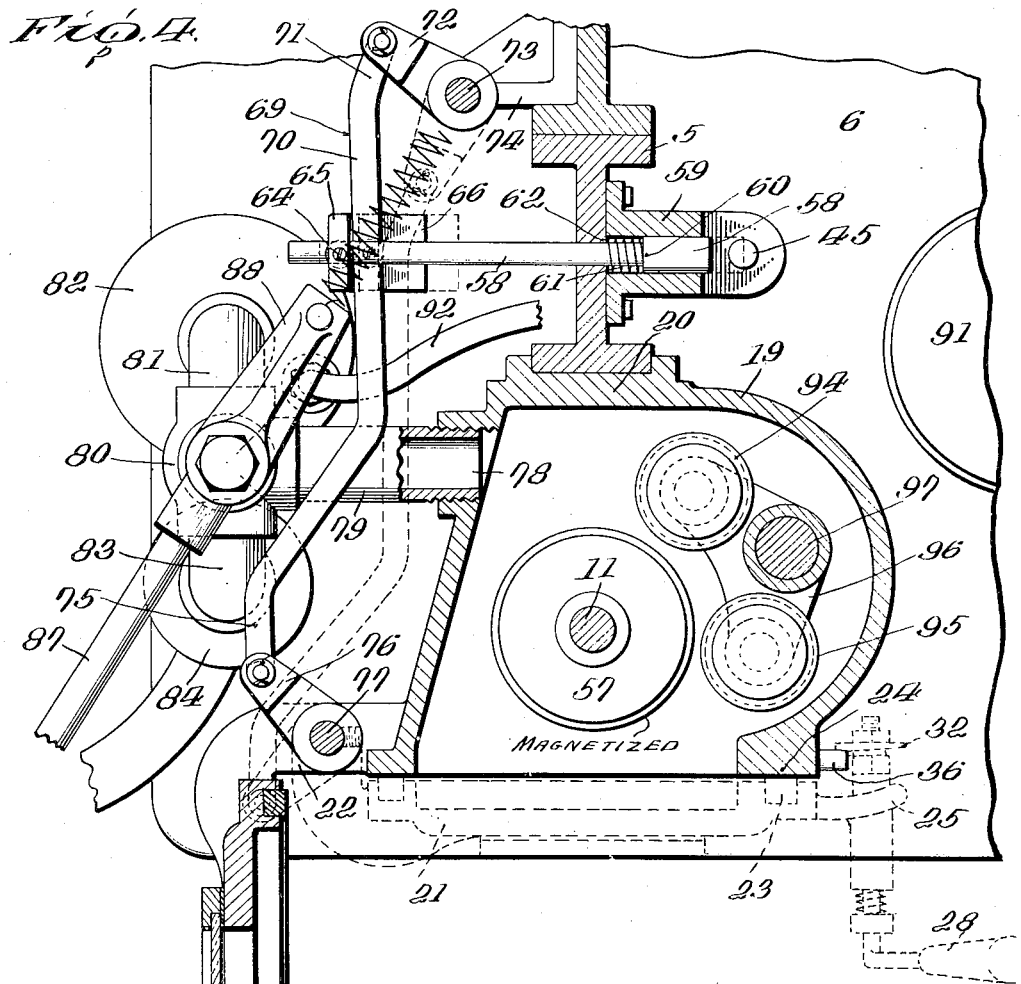
Figure 4 is a horizontal section taken substantially on the line 4—4 on Figure 2, the door being shown in the open, latch releasing position in full lines and in the closed position in dot and dash lines.
Figure 5:
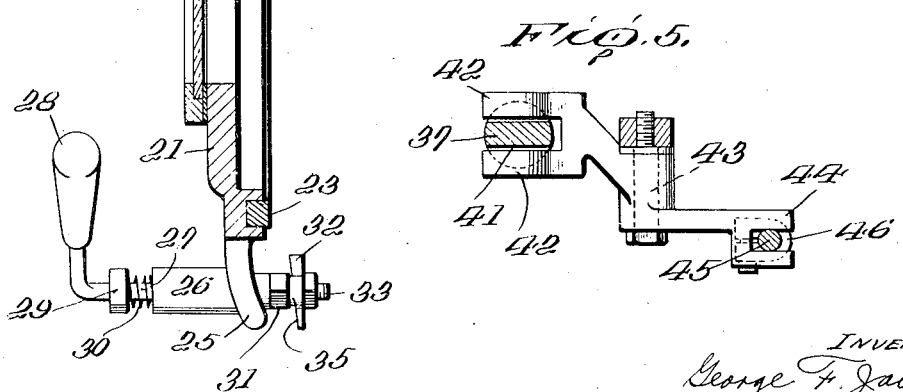
Figure 5 is a detail horizontal section taken on the line 5—5 on Figure 1.

It will be observed by reference to Figure 4 of the drawings that when the door is in the closed position the bracket roller 68, engaging the lever portion 70, will act as a stop limiting projection of the lock rod 58, assuming, of course, that the rod 45 is in its depressed or lowered position with the upper extremity 63 thereof beneath the end extremity of the rod 58 as illustrated in Figure 10. Whenever the door is opened the cranks 72 and 76 will be swung rearwardly and outwardly so as to cause the link portion 70 to move to the left and effect a displacement of the locking rod from its locking projection above the upper extremity 63 of the rod 45 so as to allow the rod 45 to move upwardly and the container supporting pad which had been held in its container chucking position by this rod to move downwardly to its normal, lowered position.

The housing 19 is provided with a vacuumizing and gassing port 78 which is connected, as at 79, with a 3-way control valve generally designated 80. One leg of the valve is connected, as at 81, with an auxiliary gas reservoir 82, and the other leg of this valve is connected, as at 83, with a vacuum source 84.

It will be obvious by reference to Figures 6, 7 and 8 that the valve 83 is equipped with a rotor 85 which is recessed at one side face, as at 86, so that it can be moved to provide communication between the housing chamber and the vacuum source as illustrated in Figure 7, or between said chamber and the auxiliary reservoir 82 as illustrated in Figure 8. The neutral position of the valve is illustrated in Figure 6, and in this position communication between the chamber and both the gas source and the vacuum source is cut off.

A hand lever 87 is connected to the valve rotor and is extended beyond its connection with the rotor, as at 88, said connnection having attached thereto one end of a retractile spring 89, the other end of said spring being anchored, as at 90, to the machine framing. The spring 89 serves to yieldably hold the valve in the neutral position illustrated in Figures 4 and 6 of the drawings.

A main, high pressure gas tank is illustrated at 91, and this tank is connected, as at 92, with the auxiliary gas tank 82 through an adjustable reducing valve 93. The main tank 91, when freshly supplied will impound an inert gas at a pressure approximating 2000 lbs., whereas a pressure of approximately 5 lbs. will be substantially constantly maintained in the auxiliary tank or reservoir 82 by proper adjustment of the reducing valve 93.

Within the upper portion of the housing chamber and properly opposed to the chuck 57 are first and second operation rollers respectively designated 94 and 95. These rollers are mounted on a carrier 96 which is secured to the lower end of a shaft 97 rockably mounted in a bearing 98 provided therefor on the top of the housing. Without the housing the shaft 97 is equipped with an operating handle 99 which can be oscillated to present first one and then the other of the seaming rollers against the chucked container and end closure in the manner well known in the art for seam sealing the container.

A gage 100 may be mounted on the housing 19 for observing pressure conditions within the vacuumizing and gassing chamber.

In the operation of the machine the door is opened and an end closure is applied to the chuck 57 so as to be magnetically retained thereagainst. The filled container which is to be vacuumized, gassed and sealed is placed upon the supporting pad 52 and then the door 21 is closed and locked, the slidable mounting of the locking handle permitting the handle to be moved longitudinally in facilitating the locking operation, and the spring 30 serving to yieldably maintain the locked condition of the door.

Thereafter the hand lever 87 is manipulated to move the control valve to the position illustrated in Figure 7, thereby to bring about an evacuation of the housing chamber and a drawing out of substantially all air contained in said chamber and in the head space of the container and the interstices in the contained product. By now manipulating the hand lever 87, the valve can be shifted to the position illustrated in Figure 8 and nitrogen or another inert gas will be thus introduced into the housing chamber to fill the head space of the container and the interstices in the contained product. By now releasing the hand lever 87 the spring 89 will move the valve and the handle to the neutral position illustrated in Figures 4 and 6 of the drawings.

When the vacuumizing and gassing of the container has been thus completed, the operator steps upon and depresses the treadle 53 thereby pulling the locking rod 45 downwardly and moving the pad supporting column 37 upwardly to chuck the container against the chuck and the end closure magnetically attracted thereagainst. Downward movement of the locking rod 45 causes the upper extremity 63 thereof to move below the path of movement of the horizontal or transverse locking rod 58, thereby permitting the spring 61 to project the rod 58 to its locking position over the rod 45 as illustrated in Figure 10. With the parts in this condition the container supporting pad will be locked in the container chucked position and the seaming or sealing operation can be performed without any danger of the pad moving downwardly in a manner for causing the formation of a faulty seal.

With the container supporting pad thus locked in the container chucked position, the operator grasps the handle 99 and imparts rocking movement to the shaft 97 to engage first the first operation roller 94 and then the second operation roller 95 against the chucked container and end closure to seam-seal the vacuumized and gassed container.

After the sealing of the container is thus completed, the handle 29 is manipulated to release the door lock and the door is swung to the open position illustrated in full lines in Figure 4. This movement of the door imparts a movement to the left of the bracket roller engaging link portion 70 in the manner hereinbefore described, and by this means the locking rod 58 is retracted from its locking position illustrated in Figure 10 and the locking rod 45 is permitted to move upwardly and the pad supporting plunger 37 moves downwardly to restore the pad to its normal, lowered position to thus complete an operating cycle of the machine.

By reason of the provision of the auxiliary gas reservoir, a balanced pressure is obtained between this reservoir and the gassing chamber within the housing 19 almost immediately when the control valve is moved to its gassing position illustrated in Figure 8, whereas if this valve were connected directly to the main tank 91 through the reducing valve it would be necessary in each gassing operation to wait a considerable interval until the desired pressure had been obtained in the vacuumizing chamber.

It is of course to be understood that the details of structure and arrangement of parts may be variously changed and modified without departing from the spirit and scope of the invention.

I claim:

1. In a container sealing machine, a container supporting pad, sealing means including a chuck, said chuck being magnetized so as to attract and hold a metallic end closure placed thereagainst, means for bringing about relative movement between said pad and chuck to cause a container on said pad and a complementary end closure attracted to said chuck to engage in assembled relation, means forming an enclosing chamber about said pad and chuck, and means for effecting first an evacuation and then a gassing of said chamber prior to the moving of said container and end closure into assembled relation, said last named means including a single control valve manually shiftable from a neutral ineffective position in one direction to an evacuation effecting position and in another direction to a gas introduction effecting position.

2. In a container sealing machine, a container supporting pad, sealing means including a chuck, said chuck being magnetized so as to attract and hold a metallic end closure placed thereagainst, means for bringing about relative movement between said pad and chuck to cause a container on said pad and a complementary end closure attracted to said chuck to engage in assembled relation, means forming an enclosing chamber about said pad and chuck, means for effecting first an evacuation and then a gassing of said chamber prior to the moving of said container and end closure into assembled relation, said last named means including a single control valve manually shiftable from a neutral ineffective position in one direction to an evacuation effecting position and in another direction to a gas introduction effecting position, and spring means constantly tending to return the valve to its neutral position.

3. In a container sealing machine, a container supporting pad, sealing means including a chuck, means for bringing about relative movement between said pad and chuck to chuck a container supported on said pad, means forming an enclosing chamber about said pad and sealing means, means for effecting first an evacuation and then a gassing of said chamber prior to the chucking of the container, said last named means including a single control valve having a rotor manually shiftable from a neutral ineffective position in one direction to an evacuation effecting position and in another direction to a gas introduction effecting position, a valve actuating hand lever attached to said rotor and having an extension extending longitudinally beyond said rotor, and an anchored retractile spring attached to said extension and constantly tending to return the rotor to and hold it in its neutral position.

4. In a container sealing machine, a container supporting pad, sealing means including a chuck, means for bringing about relative movement between said pad and chuck to chuck a container supported on said pad, means forming an enclosing chamber about said pad and sealing means, means for effecting first an evacuation and then a gassing of said chamber prior to the chucking of the container, said last named means including a vacuum source and a gas source and valve means for controlling communication between said chamber and said sources, and said gassing source including a low pressure auxiliary reservoir directly connected with said valve means and a higher pressure reservoir connected with the auxiliary reservoir through a reducing valve.

5. In a container sealing machine, a container supporting pad, sealing means including a chuck, means for bringing about relative movement between said pad and chuck to chuck a container supported on said pad, means forming an enclosing chamber about said pad and sealing means, means for effecting first an evacuation and then a gassing of said chamber prior to the chucking of the container, said last named means including a vacuum source and a gas source and valve means for controlling communication between said chamber and said sources, and said gassing source including a low pressure auxiliary reservoir directly connected with said valve means and a higher pressure reservoir connected with the auxiliary reservoir through a reducing valve, and said valve means comprising a single control valve manually shiftable from a neutral position in one direction to open communication between said chamber and the vacuum source and in another direction to open communication between said chamber and the auxiliary reservoir.

6. In a container sealing machine, a container supporting pad, sealing means including a chuck, means for bringing about relative movement between said pad and chuck to chuck a container supported on said pad, means forming an enclosing chamber about said pad and sealing means, means for effecting first an evacuation and then a gassing of said chamber prior to the chucking of the container, said last named means including a vacuum source and a gas source and valve means for controlling communication between said chamber and said sources, and said gassing source including a low pressure auxiliary reservoir directly connected with said valve means and a higher pressure reservoir connected with the auxiliary reservoir through a reducing valve, and said valve means comprising a single control valve manually shiftable from a neutral position in one direction to open communication between said chamber and the vacuum source and in another direction to open communication between said chamber and the auxiliary reservoir, and spring means constantly tending to return the valve to its neutral position.

7. In a container sealing machine, a container supporting pad, sealing means including a rotary chuck and seaming rollers movable toward and from said chuck, said chuck being magnetized so as to attract and hold a metallic end closure placed thereagainst, means for bringing about relative movement between said pad and chuck to cause a container on said pad and a complementary end closure attracted to said chuck to engage in assembled relation, means forming an enclosing chamber about said pad and chuck, means for effecting first an evacuation and then a gassing of said chamber prior to the moving of said container and end closure into assembled relation, said chamber enclosing means including a swingably mounted door, means for automatically locking the relatively moved pad and chuck in the container and end closure assembled position, means for actuating the seaming rollers, and means actuated by movement of the door to an open position for releasing said locking means to permit the relatively moved chuck or pad to return to its normal position.

8. In a container sealing machine, a vertically reciprocable container supporting pad, sealing means including a rotary chuck and seaming rollers movable toward and from said chuck, means for imparting movement to the pad for effecting a chucking of a container thereon, a housing structure including a movable door and enclosing a chamber about said pad and sealing means, means for effecting the drawing of a vacuum in said chamber, means for automatically locking the pad in its container chucking position each time it is lifted to that position, means for moving the seaming rollers to seam-seal a chucked container, and means operable by opening of the door for releasing said locking means following a seam-sealing operation thereby to permit the pad to return to its lowered position.

9. In a container sealing machine, a vertically reciprocable container supporting pad, sealing means including a rotary chuck and seaming rollers movable toward and from said chuck, means for imparting movement to the pad for effecting a chucking of a container thereon, a housing structure including a swingably mounted door and enclosing a chamber about said pad and sealing means, means for effecting the drawing of a vacuum in said chamber, means for automatically locking the pad in its container chucking position each time it is lifted to that position, means for moving the seaming rollers to seam-seal a chucked container, and means operable by opening of the door for releasing said locking means following a seam-sealing operation thereby to permit the pad to return to its lowered position, said locking means including a rod movable with the pad moving means and a spring projected locking rod automatically engageable in locking relation with the first mentioned rod as the pad attains its container chucking position to secure the pad in said chucking position, and said releasing means including an element moved by swinging of the door to an open position and operatively connected with the spring projected rod for retracting the same as said door is opened.

10. In a container sealing machine, a vertically reciprocable container supporting pad, sealing means including a rotary chuck and seaming rollers movable toward and from said chuck, means for imparting movement to the pad for effecting a chucking of a container thereon, a housing structure including a swingably mounted door and enclosing a chamber about said pad and sealing means, means for effecting the drawing of a vacuum in said chamber, means for automatically locking the pad in its container chucking position each time it is lifted to that position, means for moving the seaming rollers to seam-seal a chucked container, and means operable by opening of the door for releasing said locking means following a seam-sealing operation thereby to permit the pad to return to its lowered position, said locking means including a rod movable with the pad moving means and terminating in a locking end extremity and a spring projected locking rod traversing the path of movement of said first mentioned rod and automatically movable across said locking end extremity as the pad attains its container chucking position thereby to prevent return movement of said first mentioned rod and the pad, said spring projected rod having a bracket secured thereon and movable therewith, and said releasing means including an element movable with the door upon movement thereof to the opened position for engaging said bracket and retracting the spring projected rod to permit return movement of said first mentioned rod and the pad.

11. In a container sealing machine, a vertically reciprocable container supporting pad, sealing means including a rotary chuck and seaming rollers movable toward and from said chuck, means for imparting movement to the pad for effecting a chucking of a container thereon, a housing structure including a swingably mounted door and enclosing a chamber about said pad and sealing means, means for effecting the drawing of a vacuum in said chamber, means for automatically locking the pad in its container chucking position each time it is lifted to that position, means for moving the seaming rollers to seam-seal a chucked container, and means operable by opening of the door for releasing said locking means following a seam-sealing operation thereby to permit the pad to return to its lowered position, said locking means including a rod movable with the pad moving means and terminating in a locking end extremity and a spring projected locking rod traversing the path of movement of said first mentioned rod and automatically movable across said locking end extremity as the pad attains its container chucking position thereby to prevent return movement of said first mentioned rod and the pad, said spring projected rod having a bracket secured thereon and movable therewith, and said releasing means including a crank element swingable with the door, a crank element swingable about a fixed pivot, and a link connecting said crank elements and having a portion engageable in displacing relation with said bracket.

12. In a container sealing machine, a vertically reciprocable container supporting pad, sealing means including a rotary chuck and seaming rollers movable toward and from said chuck, means for imparting movement to the pad for effecting a chucking of a container thereon, a housing structure including a swingably mounted door and enclosing a chamber about said pad and sealing means, means for effecting the drawing of a vacuum in said chamber, means for automatically locking the pad in its container chucking position each time it is lifted to that position, means for moving the seaming rollers to seam-seal a chucked container, and means operable by opening of the door for releasing said locking means following a seam-sealing operation thereby to permit the pad to return to its lowered position, said locking means including a rod movable with the pad moving means and terminating in a locking end extremity and a spring projected locking rod traversing the path of movement of said first mentioned rod and automatically movable across said locking end extremity as the pad attains its container chucking position thereby to prevent return movement of said first mentioned rod and the pad, said spring projected rod having a bracket secured thereon and movable therewith, and said releasing means including a crank element swingable with the door, a crank element swingable about a fixed pivot, and a link connecting said crank elements and having a portion engageable in displacing relation with said bracket, said bracket having a roller supported thereon in position for being engaged by said link.

13. In a container sealing machine, a container supporting pad, sealing means including a chuck, said chuck being magnetized so as to attract and hold a metallic end closure placed thereagainst, means for bringing about relative movement between said pad and chuck to cause a container on said pad and a complementary end closure attracted to said chuck to engage in assembled relation, means forming an enclosing chamber about said pad and chuck, means for effecting first an evacuation and then a gassing of said chamber prior to the moving of said container and end closure into assembled relation, said chamber enclosing means including a swingably mounted door through which access can be had to the chamber for mounting containers and end closures and for removing sealed containers, and means for locking said door.

14. In a container sealing machine, a container supporting pad, sealing means including a chuck, said chuck being magnetized so as to attract and hold a metallic end closure placed thereagainst, means for bringing about relative movement between said pad and chuck to cause a container on said pad and a complementary end closure attracted to said chuck to engage in assembled relation, means forming an enclosing chamber about said pad and chuck, means for effecting first an evacuation and then a gassing of said chamber prior to the moving of said container and end closure into assembled relation, said chamber enclosing means including a swingably mounted door through which access can be had to the chamber for mounting containers and end closures and for removing sealed containers, a locking lug projecting from said chamber enclosing means, a bearing carried by said door, a lock handle rotatably and slidably mounted in said bearing and having thereon a recessed locking disk engageable under said lug, and spring means urging the handle longitudinally in said bearing to yieldably hold said disk against said lug.

GEORGE F. JACKSON.